(12) United States Patent
Lee et al.

(10) Patent No.: US 7,157,683 B2
(45) Date of Patent: Jan. 2, 2007

(54) METHOD, APPARATUS AND SYSTEM PROVIDING CONFIGURABLE CURRENT SOURCE DEVICE FOR IMAGE SENSORS

(75) Inventors: Chiajen Lee, Irvine, CA (US); Giuseppe Rossi, Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 229 days.

(21) Appl. No.: 10/892,316

(22) Filed: Jul. 16, 2004

(65) Prior Publication Data

US 2006/0011807 A1    Jan. 19, 2006

(51) Int. Cl.
*H01J 40/14* (2006.01)
(52) U.S. Cl. .............................. 250/214 R; 250/208.1
(58) Field of Classification Search ............ 250/208.1, 250/214 R, 214.1
See application file for complete search history.

(56) References Cited

U.S. PATENT DOCUMENTS 5,353,252 A * 10/1994 Hashimoto ............. 365/189.09

* cited by examiner

*Primary Examiner*—Que T. Le
(74) *Attorney, Agent, or Firm*—Dickstein Shapiro LLP

(57) ABSTRACT

A configurable current source for imager readout system that can be operated as a simple-current-source or as a cascode-current-source. The configurable current source can be operated in a simple-current-source mode during circumstances when a low power supply voltage or large output signal swing is needed to output a pixel signal. The configurable current source can also be operated in a cascode-current-source mode for reduced nonlinearity and column-wise fixed pattern noise when power from a power supply is not a limitation. The configurable current source provides design flexibility and pixel optimization for imager development.

43 Claims, 9 Drawing Sheets

US 7,157,683 B2

METHOD, APPARATUS AND SYSTEM PROVIDING CONFIGURABLE CURRENT SOURCE DEVICE FOR IMAGE SENSORS

FIELD OF THE INVENTION

The invention relates to imager devices and particularly to a current source for image sensors.

BACKGROUND OF THE INVENTION

Various imager circuits have been proposed such as charge coupled device (CCD) arrays, complementary metal oxide semiconductor (CMOS) arrays, arrays combining both CCD and CMOS features, as well as hybrid infrared focal-plane arrays (IR-FPAs). Conventional arrays have light-sensing elements, typically referred to as "pixels" and readout circuitry that outputs signals indicative of the light sensed by the pixels.

A CMOS imager, for example, includes a focal plane array of pixel cells; each cell includes a photodetector (e.g., a photogate, photoconductor or a photodiode) overlying a substrate for producing a photo-generated charge in a doped region of the substrate. A readout circuit is provided for each pixel cell and includes at least a source follower transistor and a row select transistor for coupling the source follower transistor to a column output line. The pixel cell also typically has a floating diffusion region, connected to the gate of the source follower transistor. Charge generated by the photodetector is sent to the floating diffusion region. The imager may also include a transistor for transferring charge from the photodetector to the floating diffusion region and another transistor for resetting the floating diffusion region to a predetermined charge level prior to charge transference.

FIG. 1 illustrates a block diagram of a CMOS imager device 908 having a pixel array 200 with each pixel cell being constructed as described above, or as other known pixel cell circuits. Pixel array 200 comprises a plurality of pixels arranged in a predetermined number of columns and rows (not shown). The pixels of each row in array 200 are all turned on at the same time by a row select line, and the pixels of each column are selectively output by respective column select lines. A plurality of row and column lines is provided for the entire array 200. The row lines are selectively activated in sequence by a row driver 210 in response to row address decoder 220. The column select lines are selectively activated in sequence for each row activation by a column driver 260 in response to column address decoder 270. Thus, a row and column address is provided for each pixel.

The CMOS imager 908 is operated by a control circuit 250, which controls address decoders 220, 270 for selecting the appropriate row and column lines for pixel readout. Control circuit 250 also controls the row and column driver circuitry 210, 260 so that they apply driving voltages to the drive transistors of the selected row and column lines. The pixel output signals typically include a pixel reset signal $V_{rst}$ taken off of the floating diffusion region when it is reset by the reset transistor and a pixel image signal $V_{sig}$, which is taken off the floating diffusion region after photo-generated charges are transferred to it. The $V_{rst}$ and $V_{sig}$ signals are read by a sample and hold circuit 265 and are subtracted by a differential amplifier 267, to produce a differential signal $V_{rst}$-$V_{sig}$ for each pixel. $V_{rst}$-$V_{sig}$ represents the amount of light impinging on the pixels. This difference signal is digitized by an analog-to-digital converter 275. The digitized pixel signals are fed to an image processor 280 to form a digital image output. The digitizing and image processing can be located on or off the imager chip. In some arrangements the differential signal $V_{rst}$-$V_{sig}$ can be amplified as a differential signal and directly digitized by a differential analog-to-digital converter.

FIG. 2 illustrates a known four transistor (4T) CMOS imager pixel cell 100. Pixel cell 100 includes a photodiode 102 connected to a transfer transistor 104. The transfer transistor 104 is also connected to floating diffusion region 108. Both a reset transistor 106 and a source follower transistor 110 are connected to floating diffusion region 108. A row select transistor 112 is connected to source follower transistor 110. The active elements of pixel cell 100 perform the functions of (1) photon to charge conversion by photodiode 102; (2) resetting the floating diffusion region to a known state before the transfer of charge to it by reset transistor 106; (3) transfer of charge to the floating diffusion region 108 by the transfer transistor 104; (4) selection of the cell 100 for readout by row select transistor 112; and (5) output and amplification of a signal representing a reset voltage (i.e., $V_{rst}$) and a pixel signal voltage (i.e., $V_{sig}$) based on the photo converted charges by source follower transistor 110. The pixel cell 100 of FIG. 2 is formed on a semiconductor substrate as part of an imager device pixel array (e.g., array 200 of FIG. 1).

FIG. 3 illustrates a typical pixel readout circuit 300. Readout circuit 300 includes the source follower transistor 110 of pixel 100, row select transistor 112 of pixel 100, current source device 320, bias generator 310, and column sample and hold network 330, which includes sampling switches SHR and SHS and column sampling capacitors Cshr and Cshs. Current source device 320 provides a constant current for pixel source follower transistor 110. Devices 320 and 110 jointly form a common-drain source follow gain stage, which transfers signal from pixel array 100 FD node to column sample and hold network 330.

Typically, the current source device 320 is implemented by connecting two transistors 115 and 117 in series, as shown in FIG. 3. In this configuration, transistor 115 is driven by a digital buffer, and therefore transistor 115 is operated as a switch that is either on or off. When transistor 115 is turned on, transistor 115 is operated in the ohmic region, and transistor 117 is operated in the saturation region. This configuration is called "simple current source".

For advanced image sensors, the design of the current source device 320 is critical because the transfer gain of the pixel source follower transistor 110 is sensitive to the current level of source device 320. Small variations on the current level would alter the source-follower transfer gain and cause undesired nonlinearity and column-wise fixed pattern noise.

Typically, the "simple current source" configuration as shown in FIG. 3 has a relatively small output resistance resulting in a relatively large current variation due to signal swing at source follower output node. This signal dependency may modify the source follower transfer gain and cause nonlinearity and column-wise fixed pattern noise.

A possible way of increasing the output resistance of the simple current source is to operate transistor 115 in the saturation region, such that transistors 115 and 117 form a well known "cascode current source" configuration. The output resistance of the cascode current source is increased by the small signal voltage gain (gm/gds) of transistor 115, which reduces non-linearity and column-wise fixed pattern noise. However, in order to keep both transistors 115 and 117 in the saturation region, the minimum terminal voltage (Vo, min) of the cascode current source has to be increased.

As a result, the allowed signal swing of pixel source follower device 110 may need to be reduced.

It is apparent that the two current source configurations each have advantages and disadvantages. A simple current source is suitable for pixels with a high output signal swing or low power supply application, while the cascode current source is superior in reducing nonlinearity and column-wise fixed pattern noise. Thus, the selection of the current source configuration may not be easily determined at design time. With advanced imager development and manufacturing flow, in order to achieve an optimal design, several candidates of photodiode and pixel are often tested on the same readout circuitry, and therefore the source follower signal swing may be undetermined at the design phase. In addition, the power supply range of the imager may be slightly changed from applications to applications, and hence the selection of the optimal current source configuration may need to be modified according to the applications.

Accordingly, there is a need and desire for an imager with flexibility in selecting the current source configuration. Such flexibility improves imager readout performance by optimizing pixel selection, readout linearity, and column-wise fixed pattern noise according to specific application needs.

SUMMARY OF THE INVENTION

An exemplary embodiment of the present invention provides a new design for an imager readout circuit in which a transistor is utilized as either a switch in "simple-current-source configuration"; or as a cascode device in a "cascode-current-source" configuration. Utilizing the transistor in this manner may reduce column-wise fixed pattern noise and current variation at the source follower transistor as compared with conventional readout circuitry.

BRIEF DESCRIPTION OF THE DRAWINGS

These and other features and advantages of the invention will be better understood from the following detailed description, which is provided in connection with the accompanying drawings, in which.

DETAILED DESCRIPTION OF THE INVENTION

In the following detailed description, reference is made to the accompanying drawings, which are a part of the specification, and in which is shown by way of illustration various embodiments whereby the invention may be practiced. These embodiments are described in sufficient detail to enable those skilled in the art to make and use the invention. It is to be understood that other embodiments may be utilized, and that structural, logical, and electrical changes, as well as changes in the materials used, may be made without departing from the spirit and scope of the present invention. Additionally, certain processing steps are described and a particular order of processing steps is disclosed; however, the sequence of steps is not limited to that set forth herein and may be changed as is known in the art, with the exception of steps or acts necessarily occurring in a certain order.

The terms "wafer" and "substrate" are to be understood as interchangeable and as including silicon, silicon-on-insulator (SOI) or silicon-on-sapphire (SOS), doped and undoped semiconductors, epitaxial layers of silicon supported by a base semiconductor foundation, and other semiconductor structures. Furthermore, when reference is made to a "wafer" or "substrate" in the following description, previous process steps may have been utilized to form regions, junctions or material layers in or on the base semiconductor structure or foundation. In addition, the semiconductor need not be silicon-based, but could be based on silicon-germanium, germanium, gallium arsenide, or other known semiconductor materials.

Figure 1:
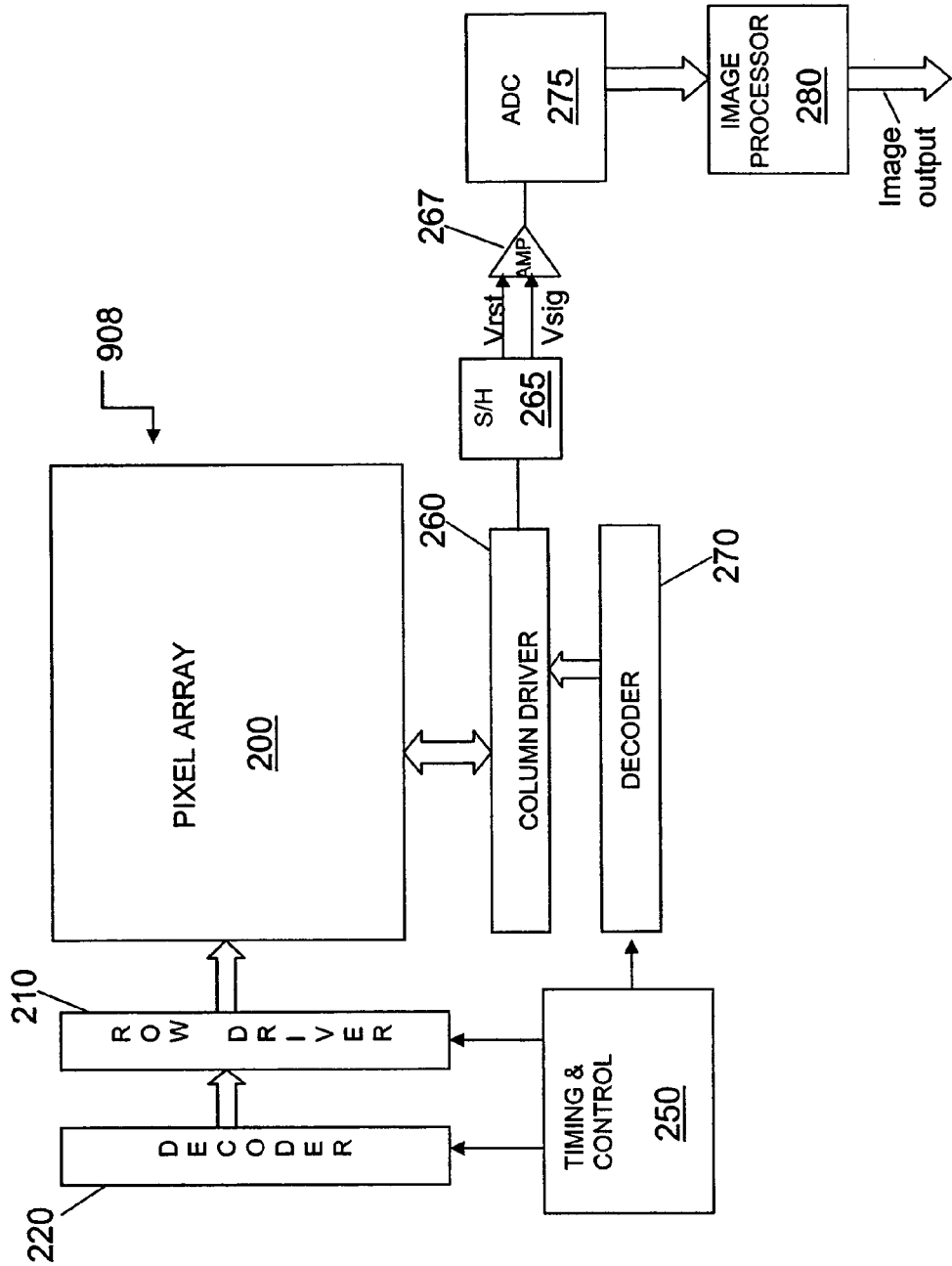
FIG. 1 is a block diagram of a conventional CMOS imager.
Figure 2:
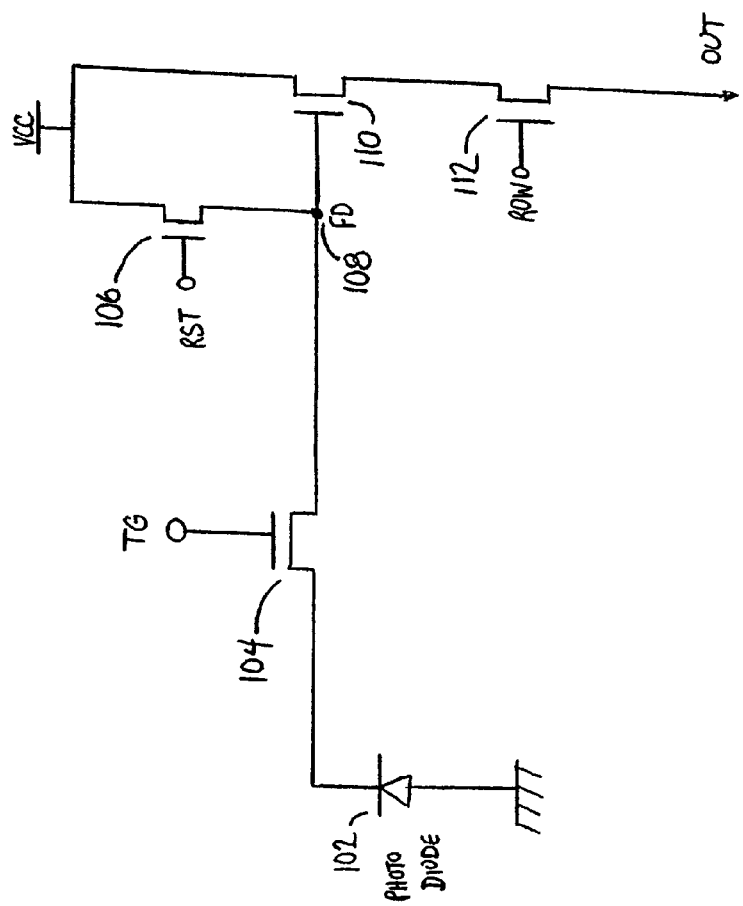
FIG. 2 is a schematic diagram of a conventional four transistor imager pixel.
Figure 3:
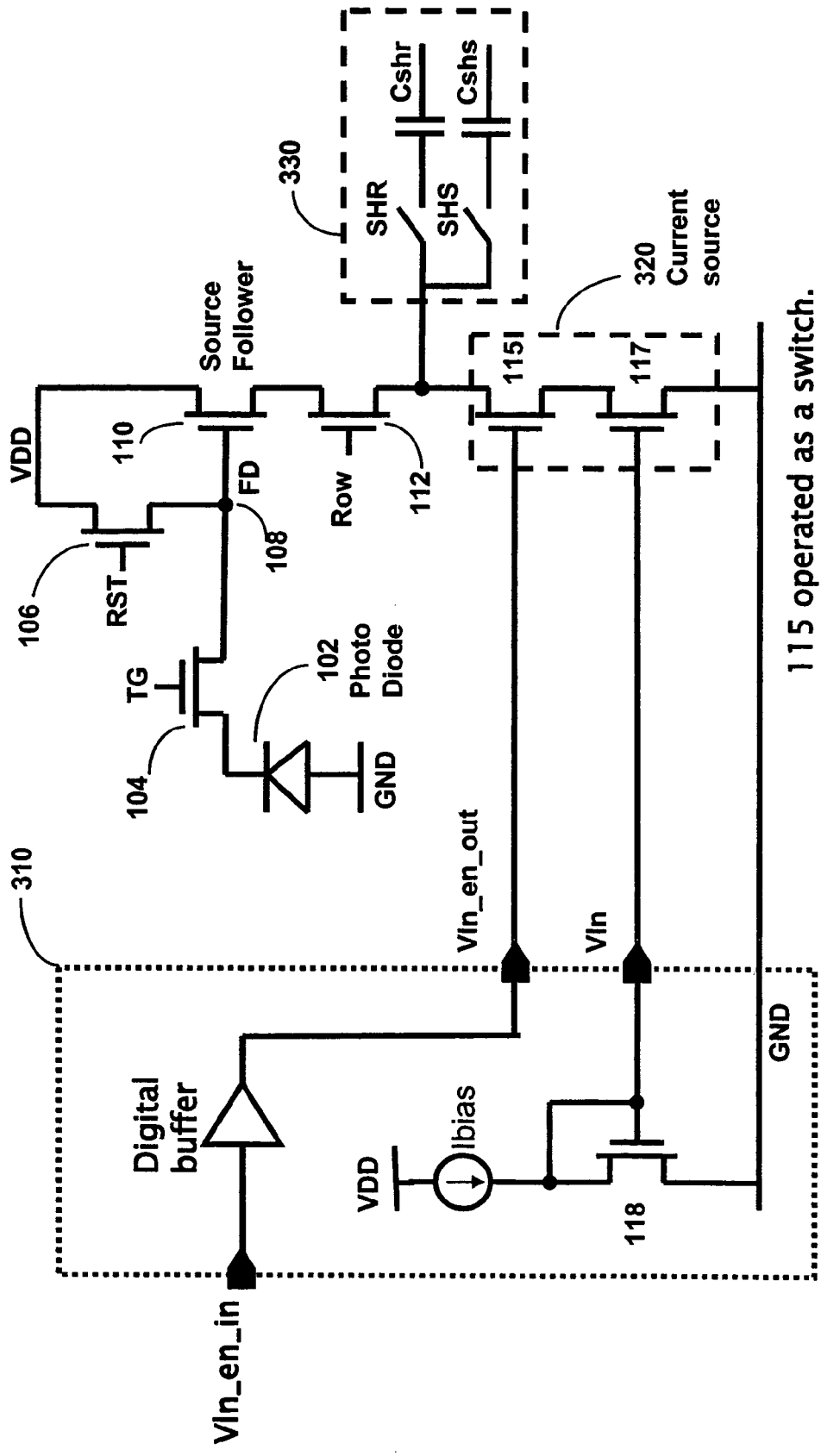
FIG. 3 is a schematic diagram of conventional imager readout circuitry.

The term "pixel" refers to a photo-element unit cell containing a photo-conversion device or photosensor, for example, a photogate, photoconductor or a photodiode and transistors for processing an electrical signal from electromagnetic radiation sensed by the photo-conversion device such as imager 908 (FIG. 1). The embodiments of pixels discussed herein are illustrated and described as employing four transistor (4T) pixel circuits for the sake of example only. It should be understood that the invention may be used with other pixel arrangements having more or less than four transistors.

Although the invention is described below with reference to a CMOS imager, the invention has more general applicability to solid state imaging devices having pixels. The following detailed description is, therefore, not to be taken in a limiting sense, and the scope of the present invention is defined only by the appended claims.

Figure 4:
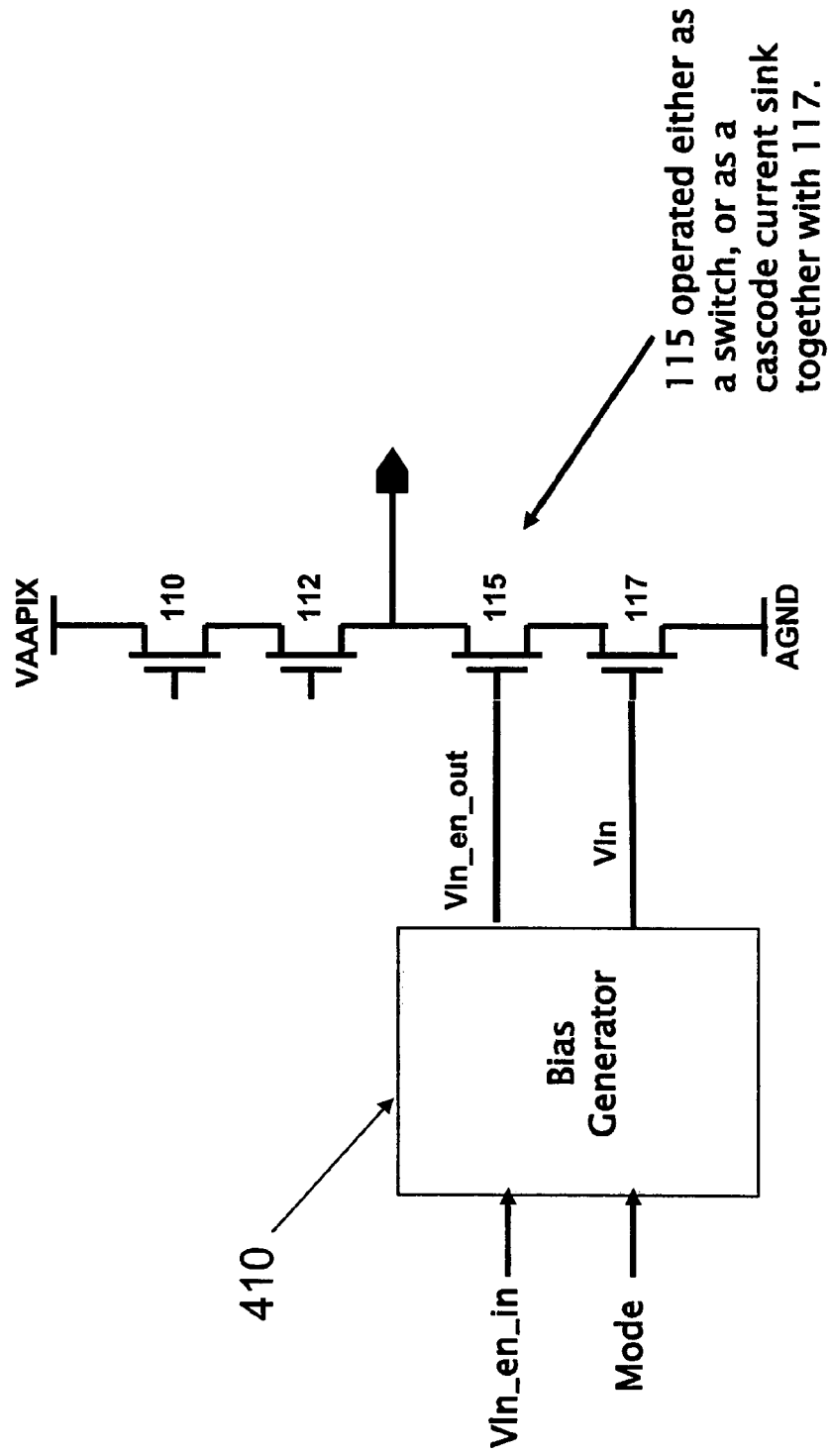
FIG. 4 is a schematic circuit diagram according to an exemplary embodiment of the invention.

FIG. 4 illustrates an imager readout circuit 400 according to an exemplary embodiment of the invention. Readout circuit 400 is similar to readout circuit 300; however, bias generating circuit 310 is replaced by bias generating circuit 410. Bias generator circuit 410 allows readout circuit 400 to be operated in simple-current-source mode, in which transistor 115 is operated as a current switch; and in cascode-current-source mode, in which transistor 115 is operated as a cascode device in conjunction with transistor 117.

Figure 5:
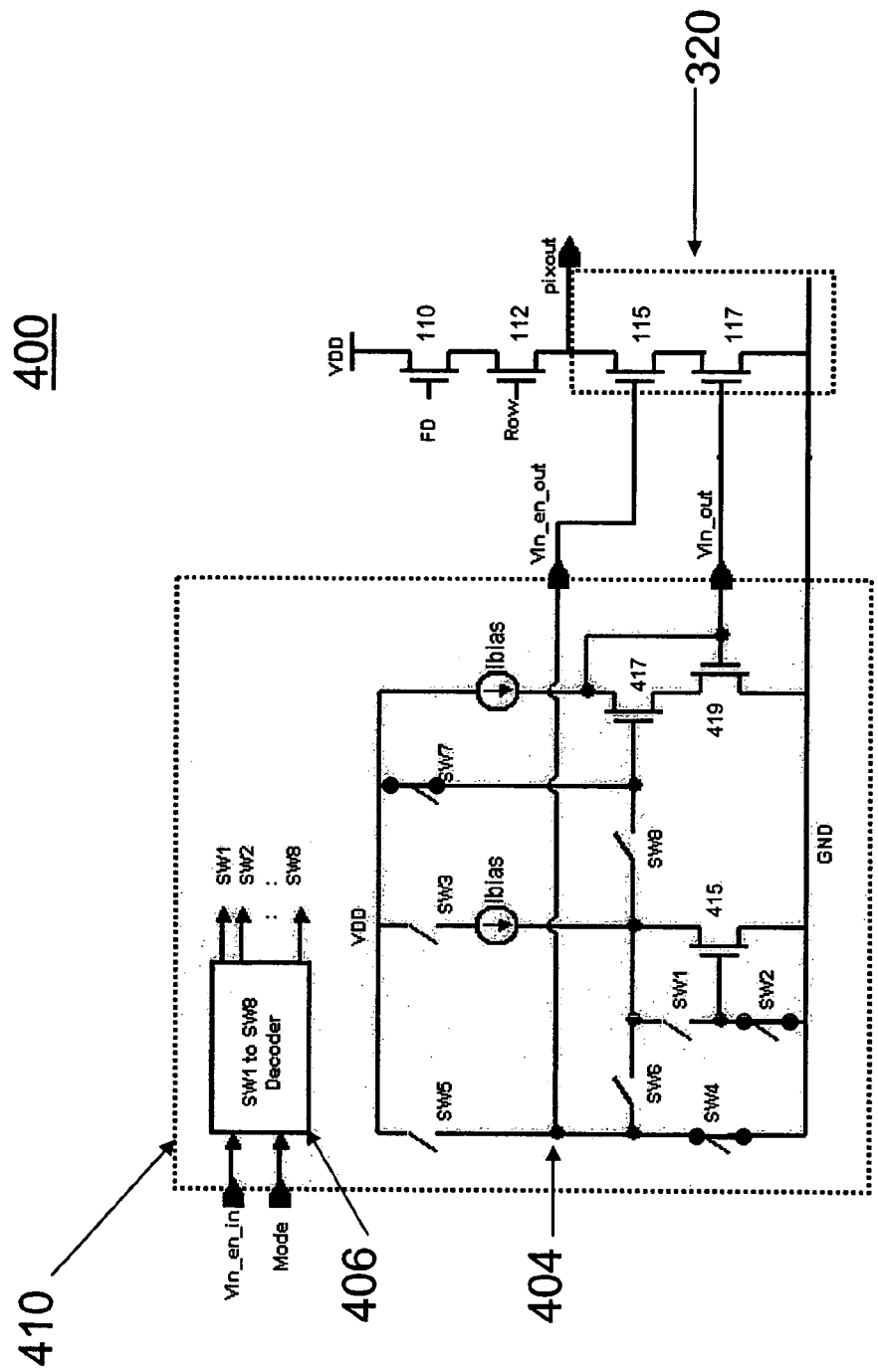
FIG. 5 is a schematic circuit diagram of a bias generator circuit in a "standby" mode according to an exemplary embodiment of the invention.

FIG. 5 illustrates the bias generator circuit 410 of imager readout circuit 400 in a "standby" operating mode. The standby mode is utilized when an image is in standby and the readout is not required. Bias generator circuit 410 includes an eight output switch decoder 406, switches SW1 through SW8 and transistors 415, 417 and 419. Eight output switch decoder 406 receives input signals Vln_en_in and Mode from a microprocessor and decodes their values to control the operation of switches SW1 through SW8. Input signals to decoder 406 for standby mode are, for example, a low Vln_en_in signal; and the Mode signal can be either high or low (don't care). As illustrated, switches SW1, SW2 and SW3 are in an off (open) position turning transistor 415 off. Switch SW4 is in an on (closed) position and switch S5 is in an off position, which sets signal Vln_en_out to 0 volts. As such, transistor 415 is isolated from a Vln_en_out node 404. The gate of transistor 417 is pulled up to VDD with the closing of switch SW7 such that Vln_out node is floating. Thus, the bias voltage can be maintained at standby mode. In addition, transistor 115 is turned off because Vln_en_out is pulled down to 0 volts, and hence there is no current flow through current source transistor 117.

Figure 6:
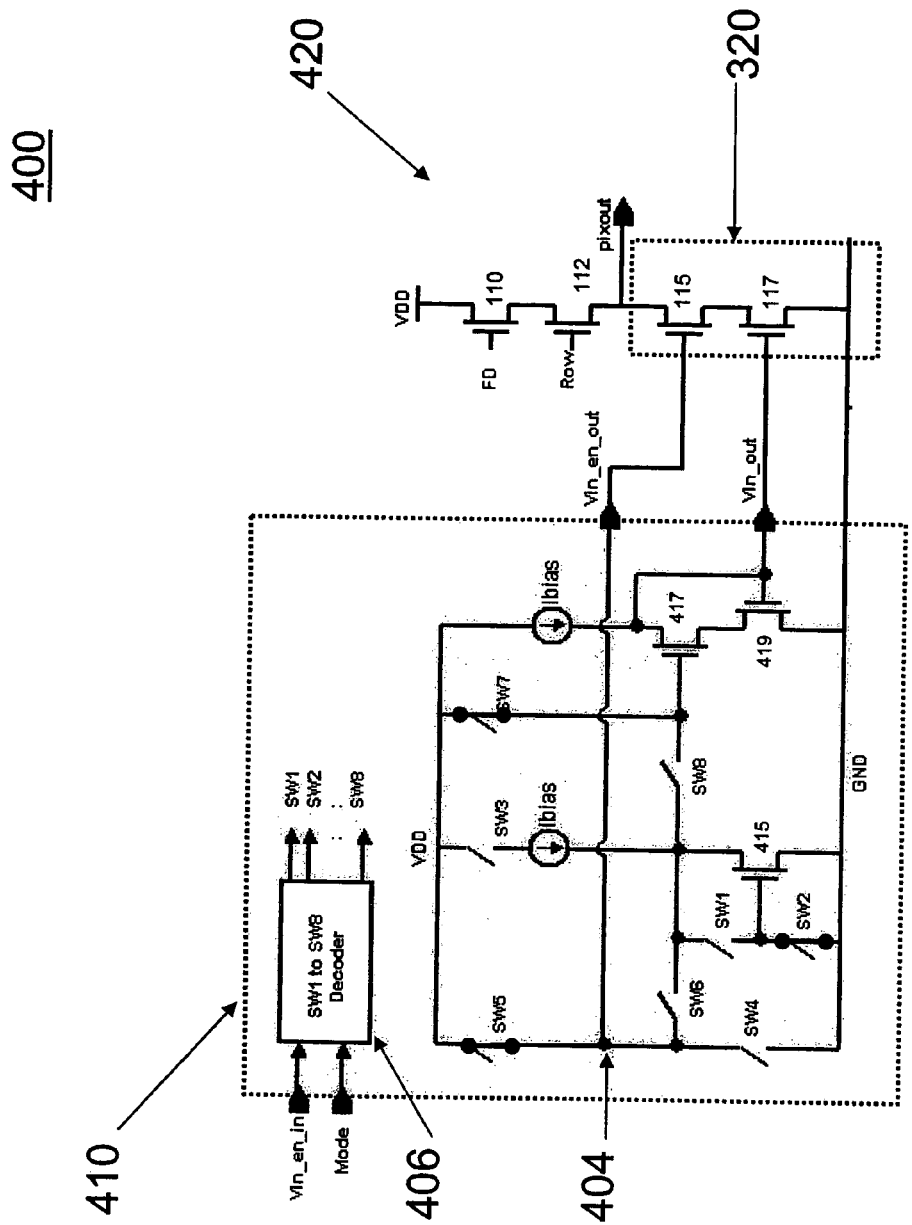
FIG. 6 is a schematic circuit diagram of the bias generator circuit in a "simple-current-source" mode according to an exemplary embodiment of the invention.

FIG. 6 illustrates the bias generator circuit 410 of imager readout circuit 400 in a simple-current-source mode of operation. The simple-current-source mode can be used in a standard readout for, for example, a low power supply application. Input signals to decoder 406 for simple-current-source mode are, for example, a high Vln_en_in signal and a low Mode signal. The configuration of bias generator 410 in simple-current-source mode is similar to that of the bias generator 410 in a standby mode; however, in the simple-current-source mode, switch SW5 is turned on (closed) and switch SW4 is turned off (open). With switch SW5 turned on (closed), Vln_en_out node 404 is pulled up to VDD, thus turning on transistor 115. Consequently, transistor 115 is in ohmic region and operated as a current switch. Operating transistor 115 as a switch increases an output signal swing for source follower transistor 110, which may be necessary for low power supply applications.

Figure 7:
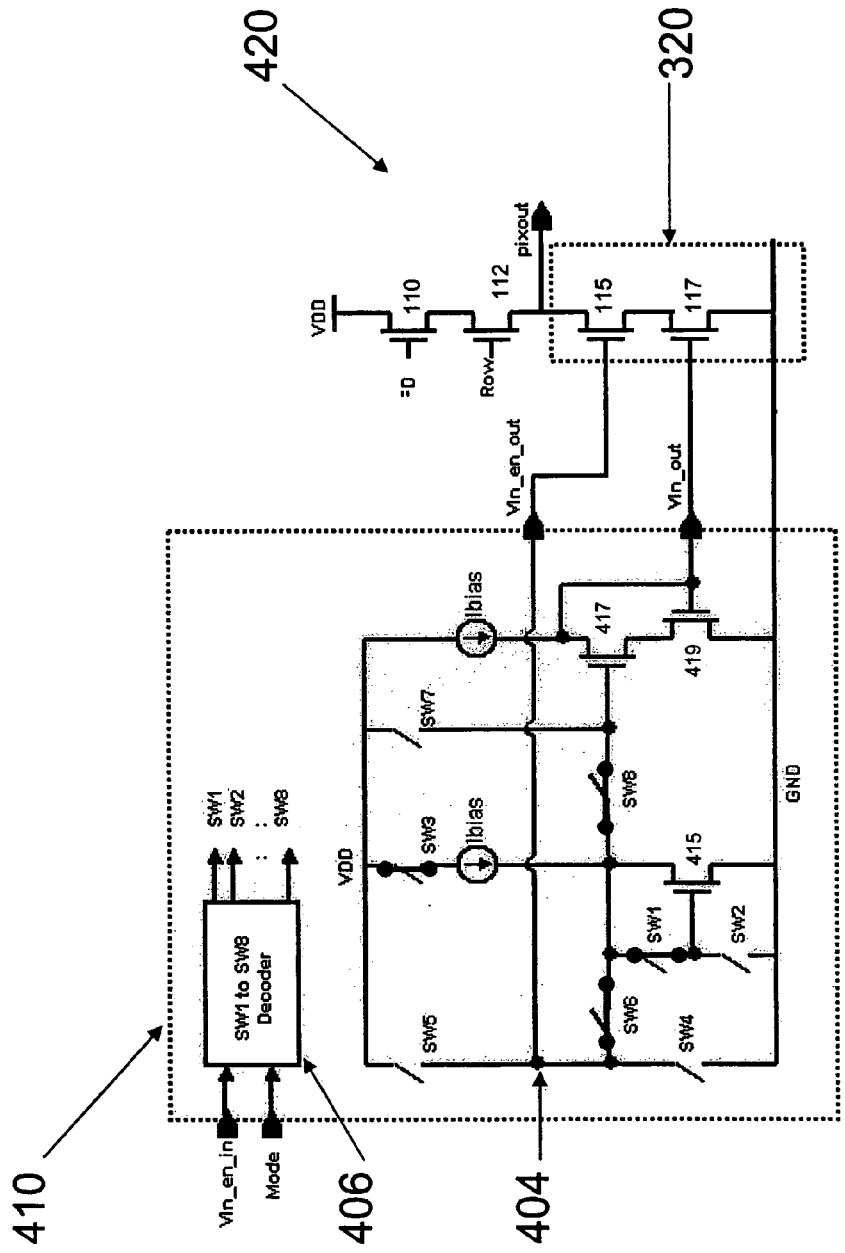
FIG. 7 is a schematic circuit diagram of the bias generator circuit in an "cascode-current-source" mode according to an exemplary embodiment of the invention.

FIG. 7 illustrates the bias generator circuit 410 of imager readout circuit 400 in a cascode-current-source mode of operation. In cascode-current-source mode, transistors 115 and 117 both operate in the saturation region and jointly form a cascode current source. This configuration provides a higher output impedance as well as an improved constant current level than that of simple-current-source mode. Consequently, this configuration reduces the undesired effect of signal-dependent source follower gain variation due to finite current source impedance, thereby improving the linearity of the transfer function of the source follower transistor 110. As a result, the signal-dependent column fixed pattern noise may be greatly reduced.

However, operating the current source device 320 in cascode-current-source mode also requires a larger drain-to-source voltage (headroom) than operation in simple-current-source mode. Therefore, it may not be feasible to operate the current source device 320 only in cascode-current-source mode. For example, when a power supply is extremely low, or when the imager is in a bright scene and hence large output signal swing is required, operating the current source device 320 in cascode-current-source mode may increase non-linearity and column fixed pattern noise as compared with operation in simple-current-source mode. Accordingly, an imager that allows an option of switching between simple-current-source mode and cascode-current-source mode is advantageous.

Another advantage of dual mode operations of the current source device 320 is the flexibility during the imager design and manufacturing. With advanced imager development flow, an optimum photo-diode pin voltage and hence the maximum swing of the source follower may not be determined at the design time. The option of operating the current source device 320 in both modes thus provides a valuable means to test for various pixel designs after the silicon is fabricated.

The operation of bias generator 410 of FIG. 7 in a cascode-current-source mode of operation is now described. The input signals to decoder 406 are, for example, a high Vln_en_in signal and a high Mode signal. Transistor 415 is in a diode-connected configuration allowing the gate of transistor 415 to be connected to its source (through SW1). In simple-current-source mode, switches SW2, SW5 and SW7 are turned on; however, in cascode-current-source mode switches SW2, SW5 and SW7 are turned off. In addition, switches SW1, SW3, SW6 and SW8 are turned on and switch SW4 is turned off. Thus, the gate-to-source voltage of transistor 415 is used to bias transistor 417 and is equivalent to the signal Vln_en_out, which is used to bias transistor 115. With switches SW1 through SW8 configured as described above, transistor 115 operates in its saturation region of the transistor curve, and when combined with transistor 117 forms a cascode current source. Transistors 417 and 419 form a cascode current source to produce signal Vln_out that drives transistor 117.

Figure 8:
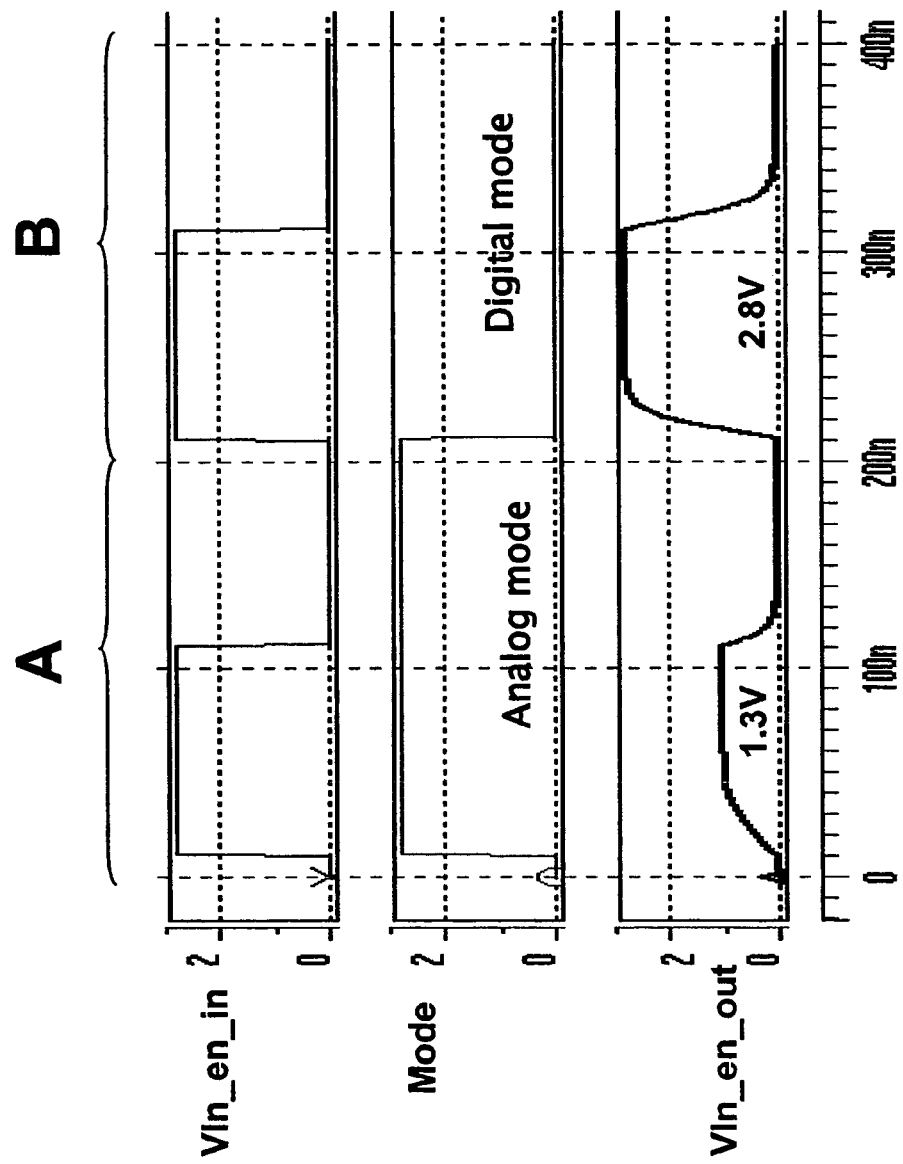
FIG. 8 is a timing diagram illustrating readout modes according to an exemplary embodiment of the invention.

FIG. 8 illustrates a timing diagram for circuit 400 in the simple-current-source and cascode-current-source modes during the readout of a pixel array. In cascode-current-source mode, which is illustrated in the diagram during time period A and occurs from 10 nanoseconds (ns) to 210 ns, the Mode signal is at approximately 2.8 volts. Consequently, as the input signal Vln_en_in varies, the bias generator circuit 410 produces an output signal Vln_en_out that results in a low output swing by the source follower 110 of pixel cell 100. In simple-current-source mode, which is illustrated in the diagram during time period B and occurs from 210 ns to 400 ns, the Mode signal is at approximately 0 volts. Consequently, as the input signal Vln_en_in varies, the bias generator circuit 410 produces an output signal Vln_en_out that results in a high output swing by the source follower 110 of pixel cell 100. With source follower transistor 110 producing a large output swing, the pixel cell's 100 can output more accurately output signals during a low power supply application. It should be noted that FIG. 8 is an example illustration showing examples of time frames A and B. The illustrated diagram should not be taken to limit the invention to any specific time period or any specific sequence of cascode-current-source or simple-current-source modes.

In an exemplary mode of operation, the decision to enter cascode-current-source mode or simple-current-source mode is determined by an image processor which supplies the signals Vln_en_in and Mode. In another exemplary mode of operation, signals Vln_en_in and Mode may be reduced to a single control signal Vln_en_mode. The following are exemplary Vln_en_mode signal voltage settings which could be used to operate the bias generator circuit 410:

| | |
|---|---|
| Standby mode | 0 volts |
| Simple-current-source mode | 1/2 VDD |
| Cascode-current-source mode | VDD |

Decoder 406 may be suitably modified to recognize this tri-state control signal.

In another exemplary mode of operation, signals Vln_en_out and Vln_out may be reduced to a single control signal Vln_control. The following are exemplary Vln_en_mode signal voltage settings output by bias generator circuit 410:

| Switch | VDD |
|--------|-----|
| Cascode | Vbias |

Current source device 320 may be suitably modified to recognize this dual-state control signal.

Figure 9:
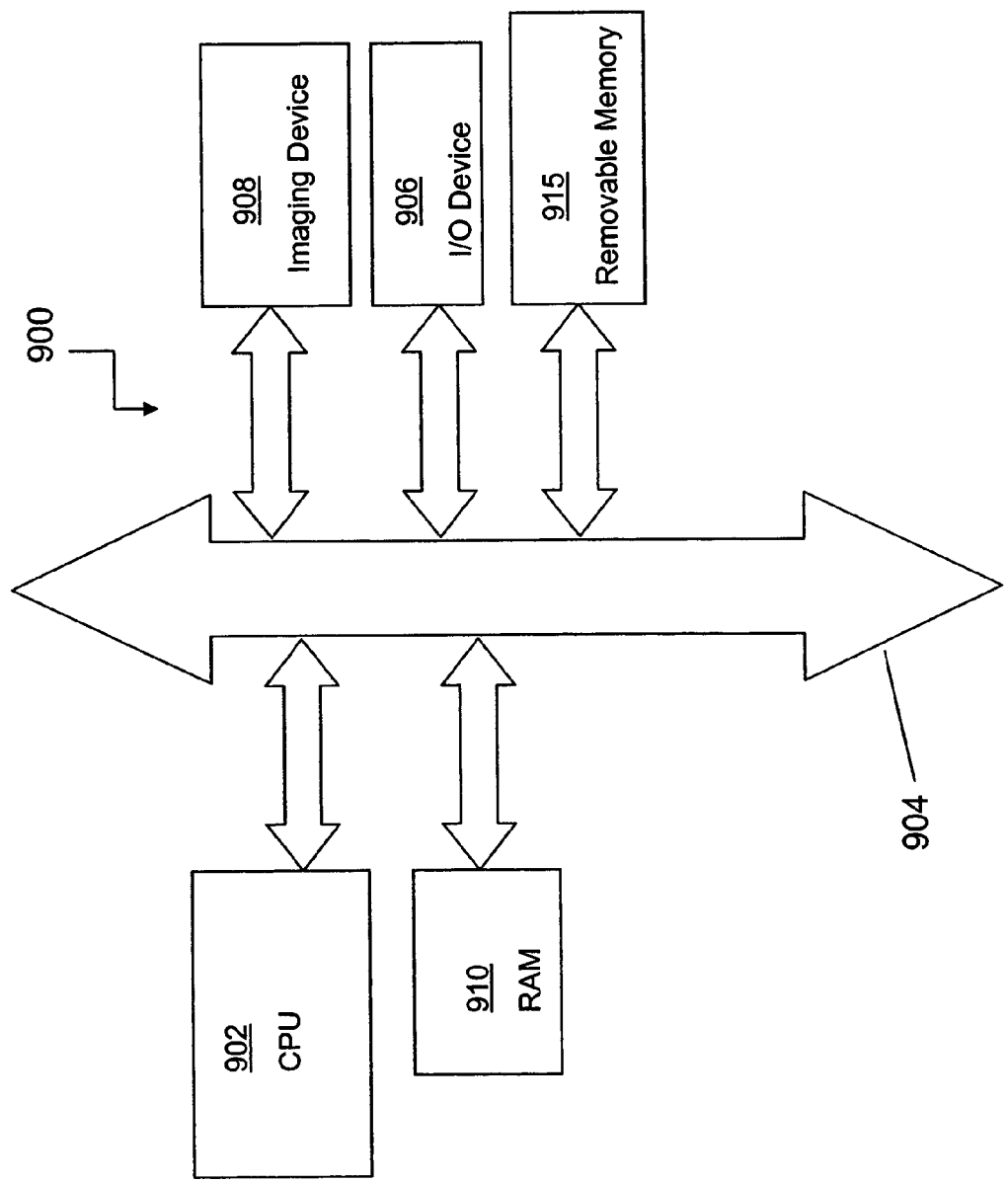
FIG. 9 is a diagram of a processing system employing an imager having an array of pixels connected to a readout circuit constructed in accordance with the exemplary embodiments of FIGS. 4–8.

FIG. 9 illustrates a processor-based system 900 including an imaging device 908 of FIG. 1. The processor-based system 900 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and data compression system.

The processor-based system 900, for example a camera system, generally comprises a central processing unit (CPU) 902, such as a microprocessor, that communicates with an input/output (I/O) device 906 over a bus 904. Imaging device 908 also communicates with the CPU 902 over bus 904. The processor-based system 900 also includes random access memory (RAM) 910, and can include removable memory 915, such as flash memory, which also communicate with CPU 902 over the bus 904. Imaging device 908 may be combined with a processor, such as a CPU, digital signal processor, or microprocessor, with or without memory storage on a single integrated circuit or on a different chip than the processor.

The devices described above illustrate typical devices of many that could be used. The above description and drawings illustrate embodiments, which achieve the objects, features, and advantages of the present invention. Various embodiments of the invention have been illustrated using a photodiode as the charge conversion device, and in the environment of a four transistor pixel. However, it should be appreciated that the invention is not so limited and can be used in any pixel architecture employing a readout circuit to read a charge converted output signal from a pixel. In addition, other types of photosensors may be used to generate image charge. Accordingly, it is not intended that the present invention be strictly limited to the above-described and illustrated embodiment. Any modifications, though presently unforeseeable, of the present invention that comes within the spirit and scope of the following claims should be considered part of the present invention.

What is claimed as new and desired to be protected by Letters Patent of the United States is:

1. A pixel readout circuit comprising:
   a readout circuit for reading a pixel output signal;
   a generator circuit for providing at least one control signal to said readout circuit to cause said readout circuit to operate in one of two different operating modes during a reading of the pixel output signal applied to said readout circuit; and
   a decoder connected to and controlling said generator circuit in response to applied control signals.

2. The circuit of claim 1, wherein said generator circuit includes a first transistor connected to a first portion of a plurality of switches, said first transistor producing a bias voltage when said first portion of said plurality of switches provides an output path from said first transistor.

3. The circuit of claim 2, wherein said generator circuit includes a second transistor connected to a second portion of said plurality of switches, said second transistor receiving said bias voltage from said first transistor when said second portion of said plurality of switches provides an output path from said first transistor.

4. The circuit of claim 3, wherein said generator circuit includes a third transistor connected to a third portion of said plurality of switches, said third transistor forming a current source with said second transistor when said second transistor receives said bias voltage.

5. The circuit of claim 1, wherein said decoder controls a plurality of switches.

6. The circuit of claim 1 further comprising a voltage source, said voltage source providing an operating voltage to said circuit.

7. The circuit of claim 1, wherein said readout circuit receives at least one control signal from said generator circuit.

8. The circuit of claim 7, wherein said at least one control signal operates said readout circuit in a cascode-current-source mode.

9. The circuit of claim 8, wherein said readout circuit operates as a cascode device in response to said at least one control signal received from said generator circuit.

10. The circuit of claim 7, wherein said at least one control signal operates said readout circuit in a simple-current-source mode.

11. The circuit of claim 10, wherein said readout circuit operates as a switch in response to said at least one control signal received from said generator circuit.

12. The circuit of claim 1, wherein said generator circuit outputs a biasing voltage when said readout circuit is operated in a cascode-current-source mode.

13. The circuit of claim 1, wherein said generator circuit outputs an operating voltage when said readout circuit is operated a simple-current-source mode.

14. The circuit of claim 4, wherein said third transistor of said generator circuit forms a cascode current source when said second transistor of said generator circuit receives said bias voltage from said first transistor to output an output signal from said pixel.

15. A bias generating circuit comprising:
   a plurality of switches;
   a decoder connected to and controlling the operation of said plurality of switches in response to applied control signals;
   a first transistor connected to a first portion of said plurality of switches, said first transistor producing a bias voltage when said first portion of said plurality of switches provides an output path from said first transistor;
   a second transistor connected to a second portion of said plurality of switches, said second transistor receiving said bias voltage from said first transistor when said second portion of said plurality of switches provides an output path from said first transistor;
   a third transistor connected to a third portion of said plurality of switches, said third transistor forming a current source with said second transistor when said second transistor receives said bias voltage for outputting an output signal from a pixel.

16. A column readout circuit comprising:
   a column sample and hold circuit; and
   a bias generating circuit comprising:
      a configurable current source device for reading a pixel output signal;
      a generator circuit for providing at least one control signal to said configurable current source device to cause a readout circuit to operate in one of two different operating modes during the reading of a pixel output signal applied to said readout circuit; and a decoder connected to and controlling said generator circuit in response to applied control signals.

17. The circuit of claim 16, wherein said generator circuit includes a first transistor connected to a first portion of said plurality of switches, said first transistor producing a bias voltage when said first portion of said plurality of switches provides an output path from said first transistor.

18. The circuit of claim 17, wherein said generator circuit includes a second transistor connected to a second portion of said plurality of switches, said second transistor receiving said bias voltage from said first transistor when said second portion of said plurality of switches provides an output path from said first transistor.

19. The circuit of claim 18, wherein said generator circuit includes a third transistor connected to a third portion of said plurality of switches, said third transistor forming a current source with said second transistor when said second transistor receives said bias voltage.

20. The circuit of claim 16 further comprising a voltage source said voltage providing an operating voltage to said circuit.

21. The circuit of claim 16, wherein said configurable current source device receives at least one control signal from said generator circuit.

22. The circuit of claim 21, wherein said at least one control signal operates said configurable current source device in a cascode-current-source mode.

23. The circuit of claim 22, wherein said configurable current source device operates as a cascode device in response to said at least one control signal received from said generator circuit.

24. The circuit of claim 21, wherein said at least one control signal operates said configurable current source device in a simple-current-source mode.

25. The circuit of claim 24, wherein said configurable current source device operates as a switch in response to said at least one control signal received from said generator circuit.

26. The circuit of claim 16, wherein said generator circuit outputs a biasing voltage when said readout circuit is operated in a cascode-current-source mode.

27. The circuit of claim 16, wherein said generator circuit outputs an operating voltage when said readout circuit is operated a simple-current-source mode.

28. The circuit of claim 19, wherein said third transistor of said generator circuit forms a cascode current source when said second transistor of said generator circuit receives said bias voltage from said first transistor to output an output signal from a pixel.

29. The circuit of claim 16 wherein said configurable current source device further comprises:
a current source transistor for providing a current source to a column of pixels; and
a switch transistor connected to said current source transistor.

30. An imaging system comprising:
a processor;
an imaging device comprising an array of pixels coupled to said processor;
a configurable current source device; and
a bias generating circuit including:
a readout circuit for reading a pixel output signal;
a generator circuit for providing at least one control signal to said readout circuit to cause said readout circuit to operate in one of two different operating modes during the reading of a pixel output signal applied to said readout circuit; and
a decoder connected to and controlling said generator circuit in response to applied control signals.

31. The system of claim 30, wherein said configurable current source device receives at least one control signal from said generator circuit.

32. The system of claim 31, wherein said at least one control signal operates said configurable current source device in a cascode-current-source mode.

33. The system of claim 32, wherein said configurable current source device operates as a cascode device in response to said at least one control signal received from said generator circuit.

34. The system of claim 31, wherein said at least one control signal operates said configurable current source device in a simple-current-source mode.

35. The system of claim 34, wherein said configurable current source device operates as a switch in response to said at least one control signal received from said generator circuit.

36. The system of claim 30, wherein said generator circuit includes cascode current source.

37. The system of claim 30 wherein said configurable current source device further comprises:
a current source transistor for providing a current source to a column of pixels; and
a switch transistor connected to said current source transistor.

38. A method of reading out a pixel output signal comprising:
receiving an output signal from a pixel onto an output line;
controlling the output signal readout from said output line based on a mode of operation of a bias generating circuit; and
selecting a mode of operation of said biasing circuit in accordance with at least one control signal.

39. The method of claim 38, wherein a mode of operation for said bias generating circuit is a cascode-current-source mode.

40. The method of claim 39 further comprising outputting a biasing voltage from said bias generating circuit to said output line.

41. The method of claim 38, wherein a mode of operation for said bias generating circuit is a simple-current-source mode.

42. The method of claim 41 further comprising outputting an operating voltage from said bias generating circuit to said output line.

43. The method of claim 38, wherein said output line operates as a cascode current source.

* * * * *